United States Patent
Fukasawa et al.

(10) Patent No.: US 10,463,944 B2
(45) Date of Patent: Nov. 5, 2019

(54) SENSOR DEVICE AND RECORDING MEDIUM

(71) Applicant: SONY CORPORATION, Tokyo (JP)

(72) Inventors: Naofumi Fukasawa, Tokyo (JP); Hideyuki Matsunaga, Kanagawa (JP); Takaomi Kimura, Tokyo (JP); Ryo Mukaiyama, Tokyo (JP); Kosei Yamashita, Kanagawa (JP); Renji Tamura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 100 days.

(21) Appl. No.: 15/033,397

(22) PCT Filed: Nov. 18, 2014

(86) PCT No.: PCT/JP2014/080500
§ 371 (c)(1),
(2) Date: Apr. 29, 2016

(87) PCT Pub. No.: WO2015/098365
PCT Pub. Date: Jul. 2, 2015

(65) Prior Publication Data
US 2016/0271480 A1   Sep. 22, 2016

(30) Foreign Application Priority Data

Dec. 24, 2013   (JP) ................. 2013-265630

(51) Int. Cl.
*A63B 71/06* (2006.01)
*G09B 19/00* (2006.01)
(Continued)

(52) U.S. Cl.
CPC .............. *A63B 71/06* (2013.01); *A63B 71/02* (2013.01); *G06F 1/32* (2013.01); *G09B 19/0038* (2013.01);
(Continued)

(58) Field of Classification Search
CPC ...... A63B 71/02; A63B 71/06; G09B 19/0038
See application file for complete search history.

(56) References Cited

U.S. PATENT DOCUMENTS 4,861,034 A * 8/1989 Lee .................... A63B 69/3635
273/DIG. 30
5,582,325 A * 12/1996 Janier ............... A63B 57/0006
221/185
(Continued)

FOREIGN PATENT DOCUMENTS

JP   2011-525414   9/2011
JP   2012-040925   3/2012
(Continued)

*Primary Examiner* — James S. McClellan
*Assistant Examiner* — Kevin M Carter
(74) *Attorney, Agent, or Firm* — Paratus Law Group, PLLC

(57) ABSTRACT

There is provided a sensor device capable of operating and reducing electric power consumption effectively, in response to sensing data of a state of the hitting tool used by the user, the sensor device including: a sensor unit configured to directly or indirectly detect sensing data indicating a motion and an orientation of a hitting tool, a communication unit configured to transmit the sensing data detected by the sensor unit to an external device, and a control unit configured to control operation of the sensor unit and the communication unit. The control unit or the sensor unit changes at least one of the sensor unit and the control unit to an electric power saving mode, upon detecting that the hitting tool has a specific orientation for a certain amount of time.

16 Claims, 9 Drawing Sheets

(51) Int. Cl.
*A63B 71/02* (2006.01)
*G06F 1/32* (2019.01)
*H04W 52/02* (2009.01)

(52) U.S. Cl.
CPC ...... *H04W 52/0254* (2013.01); *H04W 52/029* (2013.01); *H04W 52/0258* (2013.01); *Y02D 70/00* (2018.01); *Y02D 70/142* (2018.01); *Y02D 70/144* (2018.01); *Y02D 70/164* (2018.01)

(56) References Cited

U.S. PATENT DOCUMENTS

| | | | | |
|---|---|---|---|---|
| 6,050,922 | A * | 4/2000 | Wang | A63B 22/02 482/54 |
| 8,992,346 | B1 * | 3/2015 | Raposo | G01C 21/16 473/407 |
| 9,248,353 | B1 * | 2/2016 | Koenig | A63B 57/00 |
| 2009/0241052 | A1 * | 9/2009 | Ha | G06F 3/017 715/772 |
| 2011/0254760 | A1 * | 10/2011 | Lloyd | G01P 15/00 345/156 |
| 2012/0115626 | A1 * | 5/2012 | Davenport | A63B 24/0006 473/223 |
| 2012/0126946 | A1 * | 5/2012 | Balareta | G06K 19/0705 340/10.1 |
| 2012/0139729 | A1 * | 6/2012 | Savarese | A63B 71/06 340/568.6 |
| 2012/0258802 | A1 * | 10/2012 | Weston | A63H 30/04 463/37 |
| 2013/0002552 | A1 * | 1/2013 | Liang | G06F 1/3259 345/159 |
| 2013/0128022 | A1 * | 5/2013 | Bose | H04N 7/18 348/77 |
| 2013/0267335 | A1 * | 10/2013 | Boyd | A63B 69/36 473/222 |
| 2014/0022168 | A1 * | 1/2014 | Kao | G06F 3/0325 345/157 |
| 2014/0277630 | A1 * | 9/2014 | Meadows | G01S 19/19 700/91 |
| 2015/0057111 | A1 * | 2/2015 | Tremblay-Munger | A63B 69/0026 473/446 |

FOREIGN PATENT DOCUMENTS

| | | |
|---|---|---|
| JP | 2012-507802 | 3/2012 |
| JP | 2012-157644 | 8/2012 |
| JP | 2013-009917 | 1/2013 |
| WO | WO2006/123525 A1 | 11/2006 |

* cited by examiner

SENSOR DEVICE AND RECORDING MEDIUM

CROSS REFERENCE TO PRIOR APPLICATION

This application is a National Stage Patent Application of PCT International Patent Application No. PCT/JP2014/080500 (filed on Nov. 18, 2014) under 35 U.S.C. § 371, which claims priority to Japanese Patent Application No. 2013-265630 (filed on Dec. 24, 2013), which are all hereby incorporated by reference in their entirety.

TECHNICAL FIELD

The present disclosure relates to a sensor device and a recording medium.

BACKGROUND ART

Many technologies for supporting user's improvement of sport by utilizing sensing and analysis have been developed. In this technology, analyzing play of a user himself or herself or of another user statistically is used as one method. Thus, there is a proposed technology that automatically analyzes a motion by attaching a sensor device including sensors such as an acceleration sensor and a gyro sensor to a user or an item used by a user and analyzing sensing data acquired by the sensors (for example, refer to Patent Literature 1, etc.).

This sensor device can only include a battery of a small capacity because of its size in many cases, and frequent charging and battery exchange may impair fun of sport. On the other hand, if the sensor device is equipped with a large capacity battery to elongate an operation time of the sensor device, the weight of the sensor device itself becomes heavy, and has an influence on a user's play action of sport. Thus, there is a strong demand for electrical power saving of the sensor device provided in the item used by the user. For example, Patent Literature 2 discloses a technology of electric power control of a sensor.

CITATION LIST

Patent Literature

Patent Literature 1: JP 2012-157644A
Patent Literature 2: JP 2012-507802T

SUMMARY OF INVENTION

Technical Problem

However, a sensor device provided in a hitting tool (a tennis racket, a golf club, a bat, etc.) used by a user cannot reduce its electric power consumption effectively, only by performing electric power saving operation in a stationary condition, and there is a strong demand for reducing electric power consumption more effectively on the basis of sensing data Thus, the present disclosure proposes a new and improved sensor device and a recording medium capable of operating and reducing electric power consumption effectively, in response to sensing data of a state of the hitting tool used by the user.

Solution to Problem

According to the present disclosure, there is provided a sensor device including: a sensor unit configured to directly or indirectly detect sensing data indicating a motion and an orientation of a hitting tool; a communication unit configured to transmit the sensing data detected by the sensor unit to an external device; and a control unit configured to control operation of the sensor unit and the communication unit. The control unit or the sensor unit changes at least one of the sensor unit and the control unit to an electric power saving mode, upon detecting that the hitting tool has a specific orientation for a certain amount of time.

According to the present disclosure, there is provided a recording medium having a computer program recorded thereon, the computer program causing a computer to execute: a control step for controlling a sensor unit that directly or indirectly detects sensing data indicating a motion and an orientation of a hitting tool, a communication unit that transmits the sensing data detected by the sensor unit to an external device, and a control unit that controls operation of the sensor unit and the communication unit. The control step includes changing at least one of the sensor unit and the control unit to an electric power saving mode, when the control unit or the sensor unit detects that the hitting tool has a specific orientation for a certain amount of time.

Advantageous Effects of Invention

As described above, the present disclosure can provide a new and improved sensor device and a recording medium capable of operating by using electric power appropriately in response to sensing data of a state of the hitting tool used by the user.

Note that the effects described above are not necessarily limited, and along with or instead of the effects, any effect that is desired to be introduced in the present specification or other effects that can be expected from the present specification may be exhibited.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that description will be made in the following order.
1. Embodiment of Present Disclosure
   1.1. Overview of System
   1.2. Exemplary Function and Configuration of Sensor Device
   1.3. Exemplary Operation of Sensor Device
2. Conclusion

1. EMBODIMENT OF PRESENT DISCLOSURE

[1.1. Overview of System]

Figure 1:
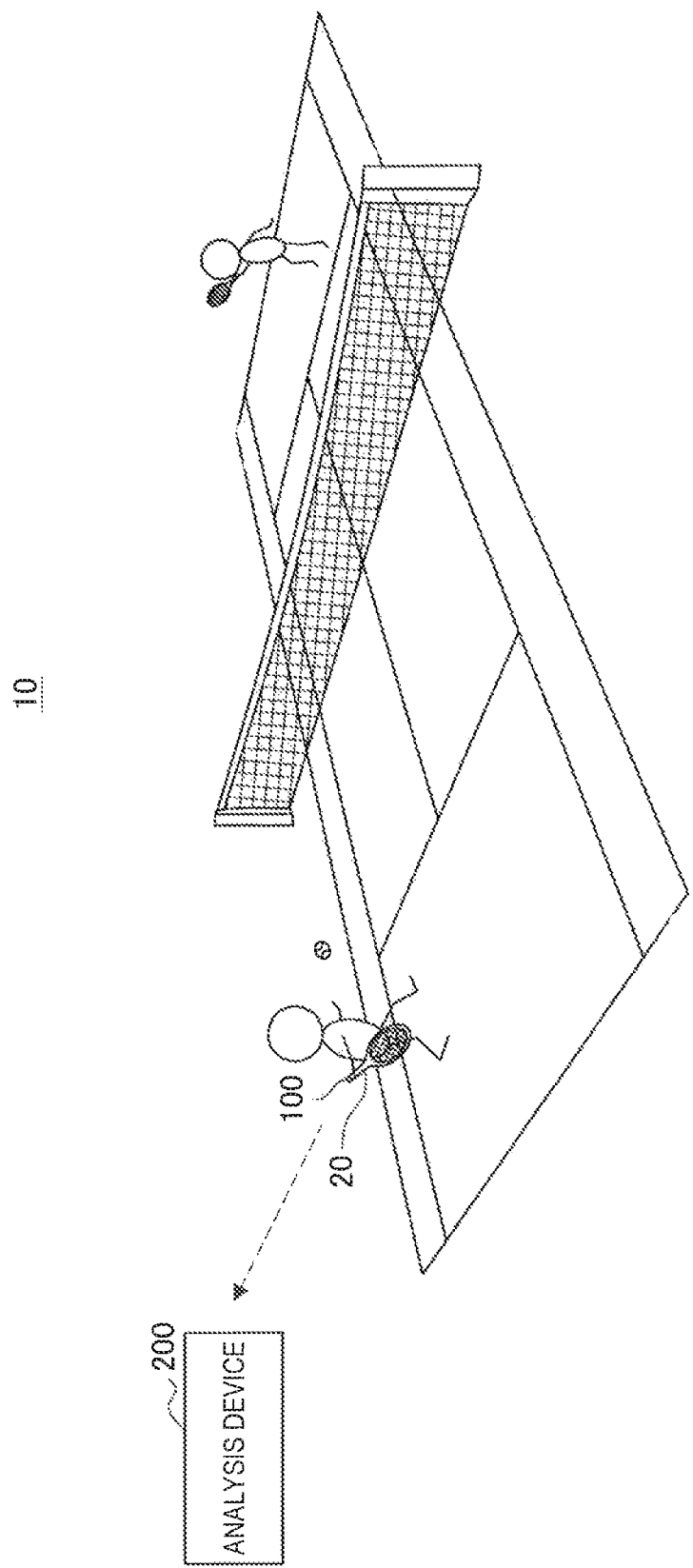
FIG. 1 is an explanatory diagram illustrating an overview of an information processing system using a sensor device according to an embodiment of the present disclosure.

First, an overview of an information processing system using a sensor device according to an embodiment of the present disclosure will be described with reference to drawings. FIG. 1 is an explanatory diagram illustrating the overview of the information processing system using the sensor device according to an embodiment of the present disclosure. In the following, the overview of the information processing system using the sensor device according to an embodiment of the present disclosure will be described by using FIG. 1.

An information processing system 10 illustrated in FIG. 1 is a system that analyzes a play action of tennis when a user plays tennis. As illustrated in FIG. 1, the information processing system 10 includes a sensor device 100 attached to a tennis racket 20 which is an example of the hitting tool, and an analysis device 200 that acquires data (sensing data) acquired by the sensor device 100 and analyzes a user's play action of tennis.

The sensor device 100 according to an embodiment of the present disclosure is configured to be attached to a grip end part of the tennis racket 20 for example, and in this case, the user attaches the sensor device 100 to the tennis racket and plays tennis, in order to cause the sensor device 100 to sense a play action of tennis using the tennis racket. As a matter of course, the sensor device 100 may have a form provided in the tennis racket 20.

The sensor device 100 according to an embodiment of the present disclosure acquires sensing data indicating physical behavior (position, speed, acceleration, etc.) of the sensor device 100 itself. In this sensing data, physical behavior of the user and the item can be reflected. The sensor device 100 can include a 1-axis acceleration sensor used as a shock sensor for example, and a 3-axis, 6-axis, or 9-axis acceleration sensor, gyro sensor, geomagnetic sensor, or the like, which are used as a motion sensor for example. In addition to these sensors, the sensor device 100 may include one or a plurality of sensors that detect angular velocity, vibration, temperature, time point, or position (position on ground surface represented by latitude and longitude, or relative position to a court or the like, for example) or the like, for example. The sensor device 100 transmits time-series data obtained from these sensors to the analysis device 200.

The analysis device 200 analyzes the user's play action of tennis, by analyzing the time-series data transmitted from the sensor device 100. Although the analysis device 200 is depicted as a server in a network, the analysis device 200 may be any information processing device having a function for analyzing data by calculation using a processor such as a central processing unit (CPU) for example. In another example, the analysis device 200 can be a terminal device, such as a smartphone, a tablet terminal, or various types of personal computers (PC) for example. When the analysis device 200 is configured as a terminal device, the analysis device 200 may output information indicating play action of tennis of an analyzed user. Alternatively, when the analysis device 200 is configured as a server, the analysis device 200 may transmit information indicating a play action of tennis of a determined user to a client 300 such as a terminal device that the user uses at home for example. Further, the analysis device 200 may output statistics information such as what operation and how many times the user has performed for example, on the basis of analysis results of uses play actions of tennis, and may output information indicating tendency of the user in each operation (for example, in the case of ball sport, a position at which a ball hits the item, and power or rotation given to a ball, etc.).

In the above, the overview of the information processing system using the sensor device according to an embodiment of the present disclosure has been described by using FIG. 1.

A battery is provided in the sensor device 100, when the sensor device 100 according to an embodiment of the present disclosure is attached to a tool, such as the tennis racket 20 illustrated in FIG. 1, that the user uses in hand when the user plays sport. The sensor device 100 operates using the internal battery as an electric power source. The sensor device 100 according to an embodiment of the present disclosure is attached to a tool that the user uses in hand, such as the tennis racket 20. Thus, when charge and battery exchange become necessary frequently, user's play of sport (for example, tennis) is disturbed. However, if a large capacity battery is attached to the sensor device 100 in order to elongate operation time of the sensor device 100, the weight of the sensor device 100 itself becomes heavy this time, and has an influence on the user's play action of tennis.

Figure 2:
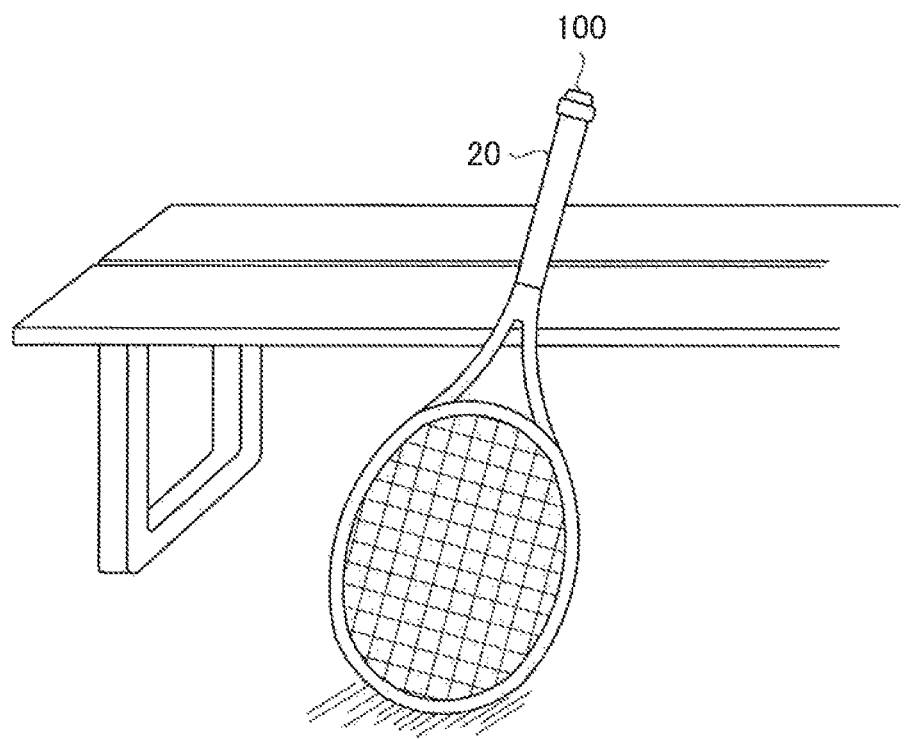
FIG. 2 is an explanatory diagram illustrating an example of a state of a tennis racket.
Figure 3:
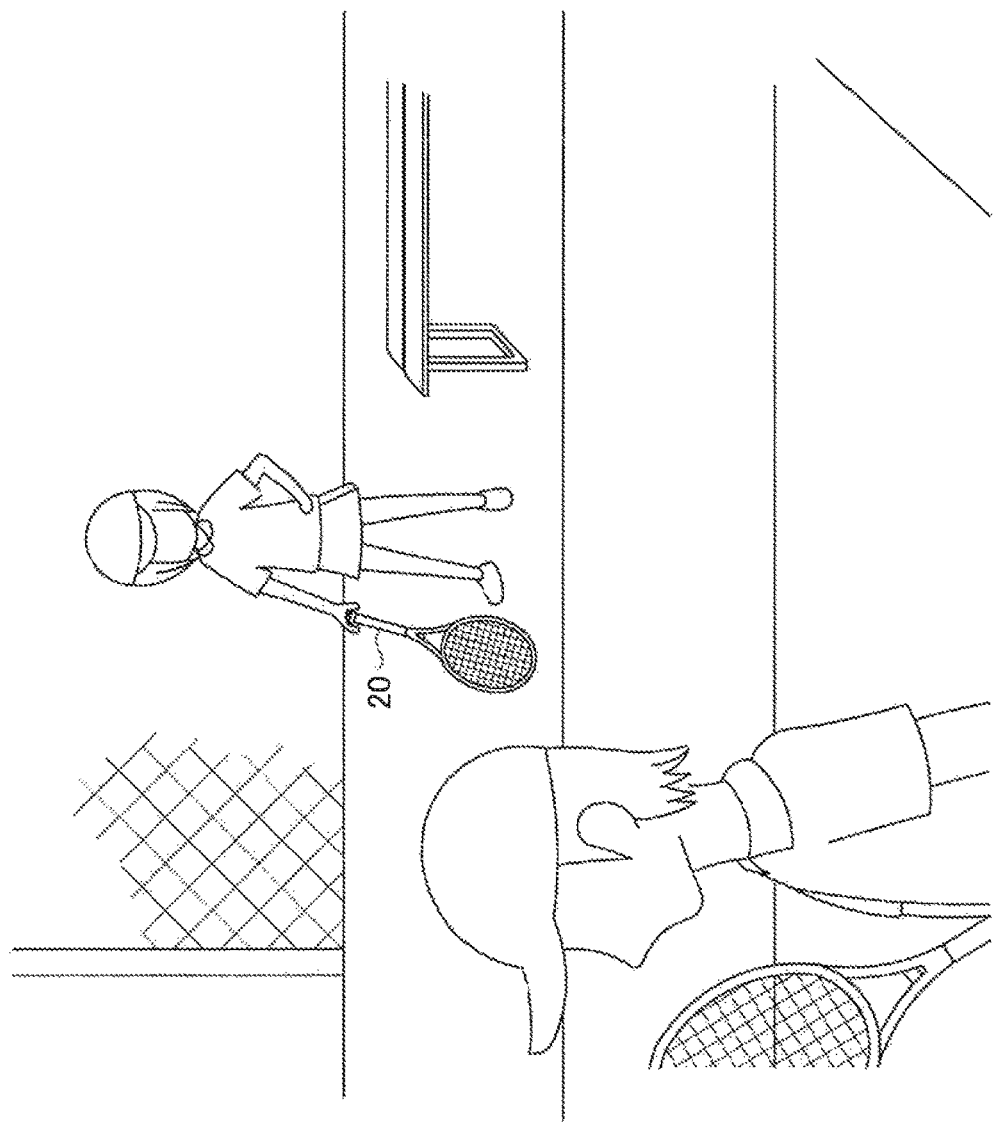
FIG. 3 is an explanatory diagram illustrating an example of a state of a tennis racket.

Thus, there is a strong need for electrical power saving of the sensor device 100. However, the sensor device 100 is attached to a tool that the user uses in hand when the user plays sport, such as the tennis racket 20. Thus, when the sensor device 100 in a stationary state is changed to a low electric power consumption state simply, it is easy to change a racket that is in a completely stationary state by leaning the racket against something as in FIG. 2, to the low electric power consumption state, but for example in a state in which the user stops playing and stands holding the racket like a stick outside a court as in FIG. 3, the sensor device 100 is not stationary completely; and therefore the sensor device 100 cannot be changed to the low electric power consumption state.

As a matter of course, the user can turn off a power supply switch explicitly, so that the sensor device 100 does not consume electric power. However, user's operation of turning on and off the power supply switch each time troubles a hand of the user, and in addition the sensor device 100 cannot acquire the play of the user when the user forgets to turn on the switch of the sensor device 100 and plays.

Thus, in an embodiment of the present disclosure, the sensor device 100 will be described, which changes electrical power saving of the sensor device 100 attached to a hitting tool such as a tennis racket, to the low electric power consumption state and the normal electric power consumption state automatically, on the basis of a feature of a situation in which a hitting tool to which the sensor device 100 is attached is used.

[1.2. Exemplary Function and Configuration of Sensor Device]

Figure 4:
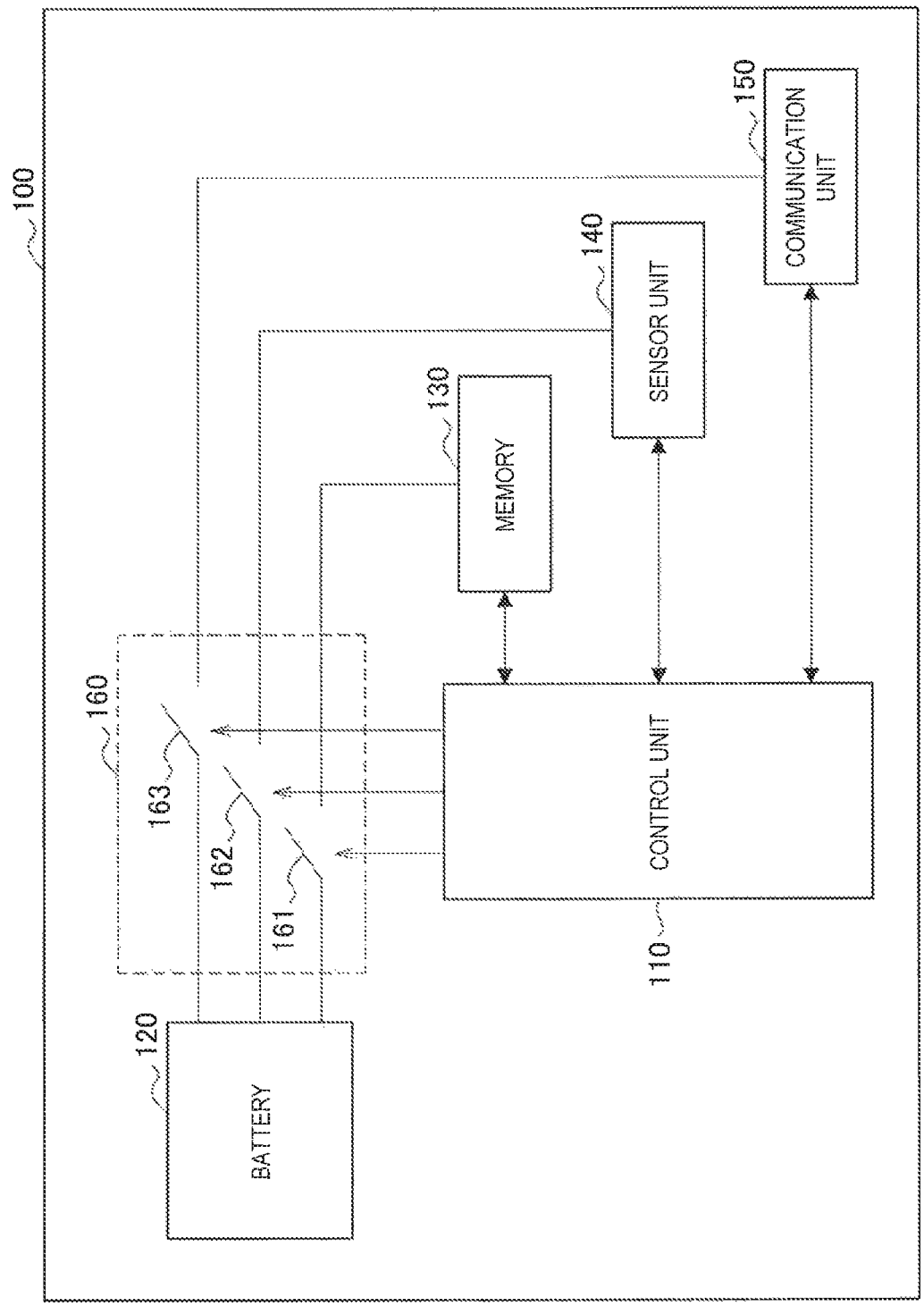
FIG. 4 is an explanatory diagram illustrating an exemplary function and configuration of a sensor device 100 according to an embodiment of the present disclosure.

Next, an exemplary function and configuration of the sensor device 100 according to an embodiment of the present disclosure will be described. FIG. 4 is an explanatory diagram illustrating an exemplary function and configuration of the sensor device 100 according to an embodiment of the present disclosure. In the following, an exemplary function and configuration of the sensor device 100 according to an embodiment of the present disclosure will be described by using FIG. 4.

As illustrated in FIG. 4, the sensor device 100 according to an embodiment of the present disclosure includes a control unit 110, a battery 120, a memory 130, a sensor unit 140, a communication unit 150, and a switch unit 160.

The control unit 110 controls the operation of the sensor device 100, and can be configured with a central processing unit (CPU) or the like, for example. When the control unit 110 is configured with a CPU, the CPU can be configured with an electronic circuit. In the present embodiment, the control unit 110 can be configured to operate the sensor device 100 in at least two types of operation modes. The two types of operation modes are "electric power saving mode" and "normal mode" in the present embodiment. The electric power saving mode is a mode for causing the sensor device 100 to operate by reducing electric power consumption. When causing the sensor device 100 to operate in the electric power saving mode, the control unit 110 executes a control for reducing a clock frequency for operation of the control unit 110 itself, and reducing an acquisition frequency of information by the later described sensor unit 140, and reducing a frequency of transmission and reception of information by the communication unit 150, for example. That is, in the present embodiment, the electric power saving mode may include a state in which at least one of the control unit 110, the sensor unit 140, and the communication unit 150 operates with lower electric power consumption than the later described normal mode. On the other hand, the normal mode is a mode for causing the sensor device 100 to operate without reducing the electric power consumption.

In the present embodiment, when the state of the hitting tool to which the sensor device 100 is attached satisfies a predetermined condition, the control unit 110 changes the operation mode of the sensor device 100 to the electric power saving mode automatically. The control unit 110 changes the operation mode of the sensor device 100 to the electric power saving mode automatically, in order to save the electrical power of the sensor device 100 efficiently.

Figure 5:
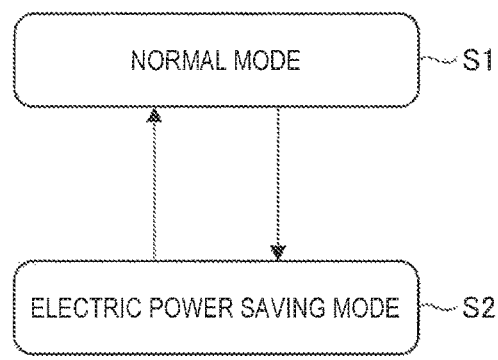
FIG. 5 is an explanatory diagram illustrating a change of an operation mode of a sensor device 100 according to an embodiment of the present disclosure.

FIG. 5 is an explanatory diagram illustrating a change of the operation mode of the sensor device 100 according to an embodiment of the present disclosure. The sensor device 100 according to an embodiment of the present disclosure operates switching between the normal mode S1 and the electric power saving mode S2, as illustrated in FIG. 5. When the operation mode is the normal mode, if a predetermined condition is satisfied, for example, if all of predetermined conditions, such as acceleration that does not change for a predetermined time, and shock that is not detected for a predetermined time, and a hitting tool that keeps facing in a substantially gravity force direction the a predetermined time (keeps facing downward), are satisfied, the control unit 110 changes the state of the sensor device 100 to the electric power saving mode. On the other hand, when the operation mode is the electric power saving mode, if a predetermined condition is satisfied, for example, if at least one of predetermined conditions, sensing a large acceleration, or sensing a shock, or an orientation of the hitting tool that changes from the electric power saving mode (for example, does not have an orientation facing toward the gravity force direction for a certain amount of time) is satisfied, the control unit 110 change the state of the sensor device 100 to the normal mode, The control unit 110 determines the state of the sensor device 100 and automatically executes the change of the operation mode, even if the user does not perform explicit manipulation, for example manipulation such as press of a switch, to the sensor device 100. Thus, the sensor device 100 according to an embodiment of the present disclosure does not trouble the hand of the user who enjoys sport by using the hitting tool to which the sensor device 100 is attached, in order to achieve efficient electrical power saving.

Note that the control unit 110 may be provided with an internal counter, for determination of switch of the operation mode of the sensor device 100. Although the detailed operation will be described later, the control unit 110 can operate to increase the value of the counter when a change condition to a predetermined electric power saving mode is satisfied, and to change the operation mode of the sensor device 100 from the normal mode to the electric power saving mode, when the value of the counter exceeds a predetermined value.

The battery 120 is a battery for supplying electric power to the control unit 110, the memory 130, the sensor unit 140, and the communication unit 150. Note that the form of the battery 120 may be a secondary battery that can be charged repeatedly, and may be a primary battery that can be discharged only.

The memory 130 contains various types of information, particularly information obtained by the sensor unit 140. Information is contained in the memory 130 by the control unit 110, for example. Also, the information contained in the memory 130 is read by the control unit 110, and is transmitted from the communication unit 150, for example. Although the memory 130 is configured to retain information without electric power supplied from the battery 120, electric power is supplied from the battery 120 at the time of write of information to the memory 130, and at the time of read of information from the memory 130. Also, a computer program read and sequentially executed from the control unit 110 may be contained in the memory 130.

The sensor unit 140 is configured with a sensor that acquires a direction and an orientation of the hitting tool to which the sensor device 100 is attached, the shock given to the hitting tool, and other state. The sensor unit 140 operates by receiving supply of electric power from the battery 120. A sensor for configuring the sensor unit 140 is, for example, a 1-axis, 3-axis, 6-axis, or 9-axis acceleration sensor, a gyro sensor, a geomagnetic sensor, or the like.

For example, the sensor unit 140 may include a shock sensor and a motion sensor. The shock sensor is a sensor of the sensor device 100 which detects a shock transmitted from the user or the hitting tool, and can include a 1-axis acceleration sensor for example, in the present embodiment. The motion sensor is a sensor that detects behavior of the sensor device 100 with a higher resolution than the shock sensor for example, and can include a 3-axis, 6-axis, or 9-axis acceleration sensor, a gyro sensor, a geomagnetic sensor, or the like, for example, in the present embodiment.

The sensor unit 140 may include any sensor for acquiring the state of the hitting tool to which the sensor device 100 is attached, such as a temperature sensor, a pressure sensor, a GPS (Global Positioning System) receiver, for example, in addition to the above shock sensor and the motion sensor.

The sensor unit 140 may include a memory that temporarily contains data acquired by the above shock sensor and the motion sensor. By equipping the sensor unit 140 with the memory that temporarily contains data, it is determined whether or not the sensor unit 140 satisfies a change condition from the electric power saving mode to the normal mode, even if the control unit 110 is configured to stop its operation completely at the time of the electric power saving mode. Also, by equipping the sensor unit 140 with the memory, data acquired by the shock sensor and the motion sensor at the time point of a change from the electric power saving mode to the normal mode can be supplied from the memory to the control unit 110.

In the present embodiment, the sensor unit 140 can be configured to operate with less electric power consumption, on the basis of control from the control unit 110. For example, when the operation mode of the sensor device 100 is the normal mode, the control unit 110 controls all sensors composing the sensor unit 140 to operate. On the other hand, when the operation mode of the sensor device 100 has become the electric power saving mode, the control unit 110 controls only a part of sensors to operate, and a sampling rate of the operating sensors to decrease, for example. Also, when the operation mode of the sensor device 100 has become the electric power saving mode, the control unit 110 may control the later described switch unit 160 in such a manner that the electric power from the battery 120 is not supplied to at least one of the memory 130, the sensor unit 140, and the communication unit 150, for example.

The communication unit 150 transmits the information to an external device, for example the analysis device 200. The communication unit 150 transmits information relevant to the hitting tool to which the sensor device 100 is attached, which is acquired by the sensor unit 140 for example, as the information to be transmitted to the analysis device 200. The communication unit 150 transmits the information by the Bluetooth (registered trademark), a wireless local area network (LAN), or the like, for example. Note that the information acquired by the sensor unit 140 is needless to be transmitted to the analysis device 200 in real time necessarily, and thus the communication unit 150 may transmit the information to the analysis device 200, by wired communication using a USB cable, a LAN cable, or the like after ending the play for example.

The switch unit 160 is configured with a switch group that controls the supply of electric power from the battery 120 to the memory 130, the sensor unit 140, and the communication unit 150. In the present embodiment, the switch unit 160 is configured with switches 161, 162, 163. The switches 161, 162, 163 are configured with metal-oxide-semiconductor field-effect transistors (MOSFET) and other switching elements for example, and are each turned on and off by the control of the control unit 110.

The switch 161 is a switch provided between the battery 120 and the memory 130, and electric power is not supplied from the battery 120 to the memory 130 in an off state of the switch 161. The switch 162 is a switch provided between the battery 120 and the sensor unit 140, and electric power is not supplied from the battery 120 to the sensor unit 140 in an off state of the switch 162. The switch 163 is a switch provided between the battery 120 and the communication unit 150, and electric power is not supplied from the battery 120 to the communication unit 150 in an off state of the switch 163.

Although, in FIG. 4, the sensor unit 140 is depicted as one block, electric power may be supplied independently to each of the motion sensor and the shock sensor from the battery 120, when the sensor unit 140 is configured with the motion sensor and the shock sensor, as described above, for example. In this case, in the sensor device 100, a switch that controls electric power supply to the motion sensor and a switch that controls electric power supply to the shock sensor can be provided separately. The control unit 110 can control the operation of the switch in such a manner to stop the electric power supply to one of the motion sensor and the shock sensor.

With the configuration as illustrated in FIG. 4, the sensor device 100 according to an embodiment of the present disclosure can change to the low electric power consumption state and change to the normal electric power consumption state automatically, on the basis of feature of a situation in which the hitting tool to which the sensor device 100 is attached is used.

In the above, an exemplary function and configuration of the sensor device 100 according to an embodiment of the present disclosure has been described by using FIG. 4. Next, an exemplary operation of the sensor device 100 according to an embodiment of the present disclosure will be described.

[1.3. Exemplary Operation of Sensor Device]

Figure 6:
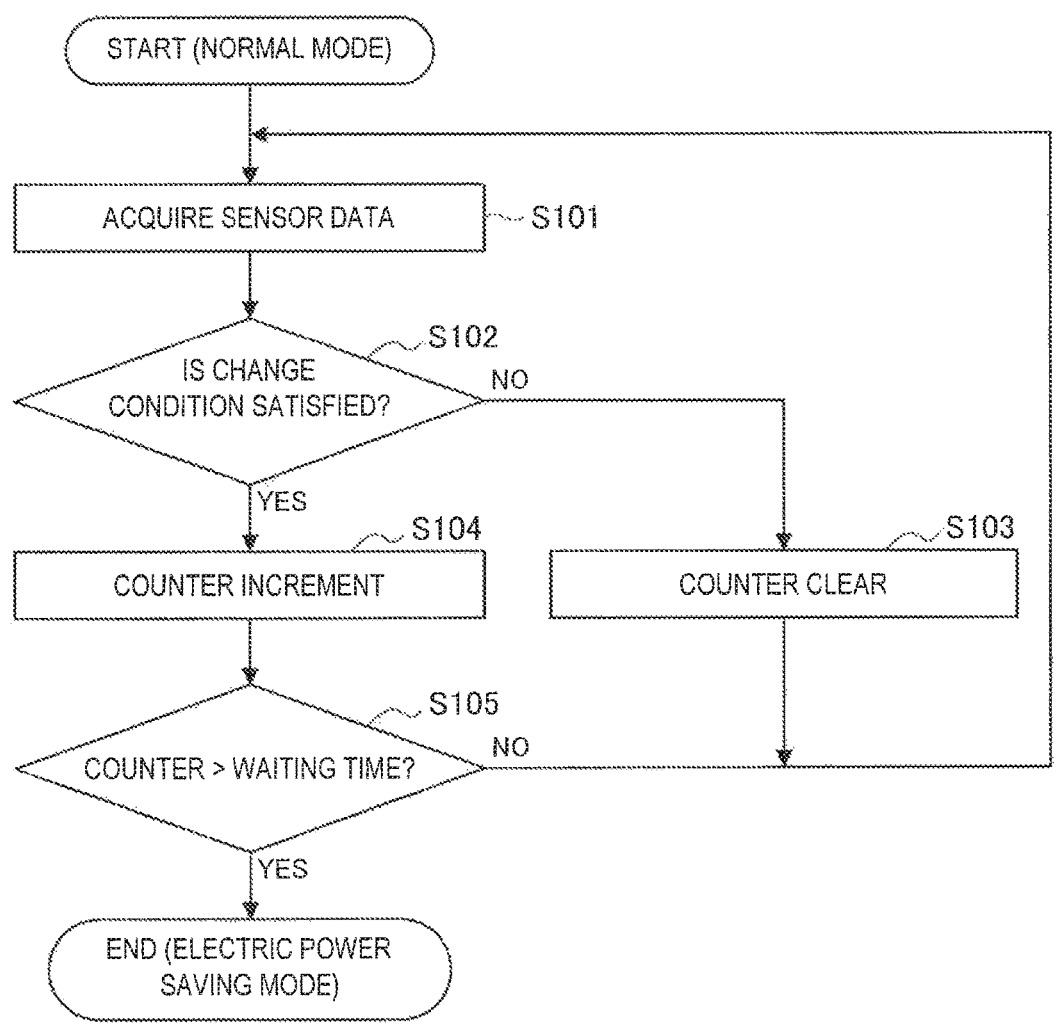
FIG. 6 is a flow diagram illustrating an exemplary operation of a sensor device 100 according to an embodiment of the present disclosure.

FIG. 6 is a flow diagram illustrating an exemplary operation of the sensor device 100 according to an embodiment of the present disclosure. FIG. 6 illustrates is an exemplary operation of the sensor device 100 when the operation mode changes to the electric power saving mode, under a circumstance that the operation mode of the sensor device 100 according to an embodiment of the present disclosure is the normal mode. In the following, an exemplary operation of the sensor device 100 according to an embodiment of the present disclosure will be described by using FIG. 6.

The sensor unit 140 acquires the state of the sensor device 100 at a predetermined sampling rate. The control unit 110 sequentially acquires the data that the sensor unit 140 has acquired at a predetermined sampling rate (step S101).

When the control unit 110 sequentially acquires the data acquired by the sensor unit 140, the control unit 110 periodically determines whether or not the data acquired by the sensor unit 140 satisfies the change condition to a predetermined electric power saving mode, by using the data acquired by the sensor unit 140 (step S102). The change condition to the electric power saving mode may be a case that satisfies all of a plurality of conditions, such as the acceleration does not change for a predetermined time, and the shock is not detected for a predetermined time, and the hitting tool keeps facing in the substantially gravity force direction for a predetermined time, as described above, for example.

If the data acquired by the sensor unit 140 does not satisfy the change condition to the predetermined electric power saving mode (step S102, No), the control unit 110 clears the counter (step S103), and returns to the process of step S101. On the other hand, if the data acquired by the sensor unit 140 satisfies the change condition to the predetermined electric power saving mode (step S102, Yes), the control unit 110 increments the counter (step S104).

Upon incrementing the counter in above step S104, the control unit 110 subsequently determines whether or not the value of the counter has exceeded a predetermined value, in other words, satisfies the change condition to the predetermined electric power saving mode for over a predetermined waiting time (step S105).

As a result of the determination of above step S105, if it is determined that the value of the counter does not exceed the predetermined value, in other words, the change condition to the predetermined electric power saving mode does not continue for over the predetermined waiting time (step S105, No), the control unit 110 returns to the process of step S101. On the other hand, as a result of the determination of above step S105, when it is determined that the value of the counter exceeds the predetermined value, in other words, the change condition to the predetermined electric power saving mode continues for over the predetermined waiting time (step S105, Yes), the control unit 110 changes the operation mode of the sensor device 100 to the electric power saving mode.

When changing the operation mode of the sensor device 100 to the electric power saving mode, the control unit 110 operates only sensors of a part of the sensor unit 140 for example, and decreases the sampling rate of the sensors, and switches the switch unit 160 so as not to apply electric current to other sensors, the memory 130, and the communication unit 150. By operating only the sensors of a part of the sensor unit 140 and decreasing the sampling rate of the sensors, the control unit 110 can reduce the electric power consumption of the battery 120. Also, when changing the operation mode of the sensor device 100 to the electric power saving mode, the control unit 110 reduces the electric power consumption of the battery 120, by operating the control unit 110 itself with reduced clock, for example.

The sensor device 100 according to an embodiment of the present disclosure can change to the low electric power consumption state automatically, on the basis of the feature of a situation in which the hitting tool to which the sensor device 100 is attached is used, by executing the above operation.

Figure 7:
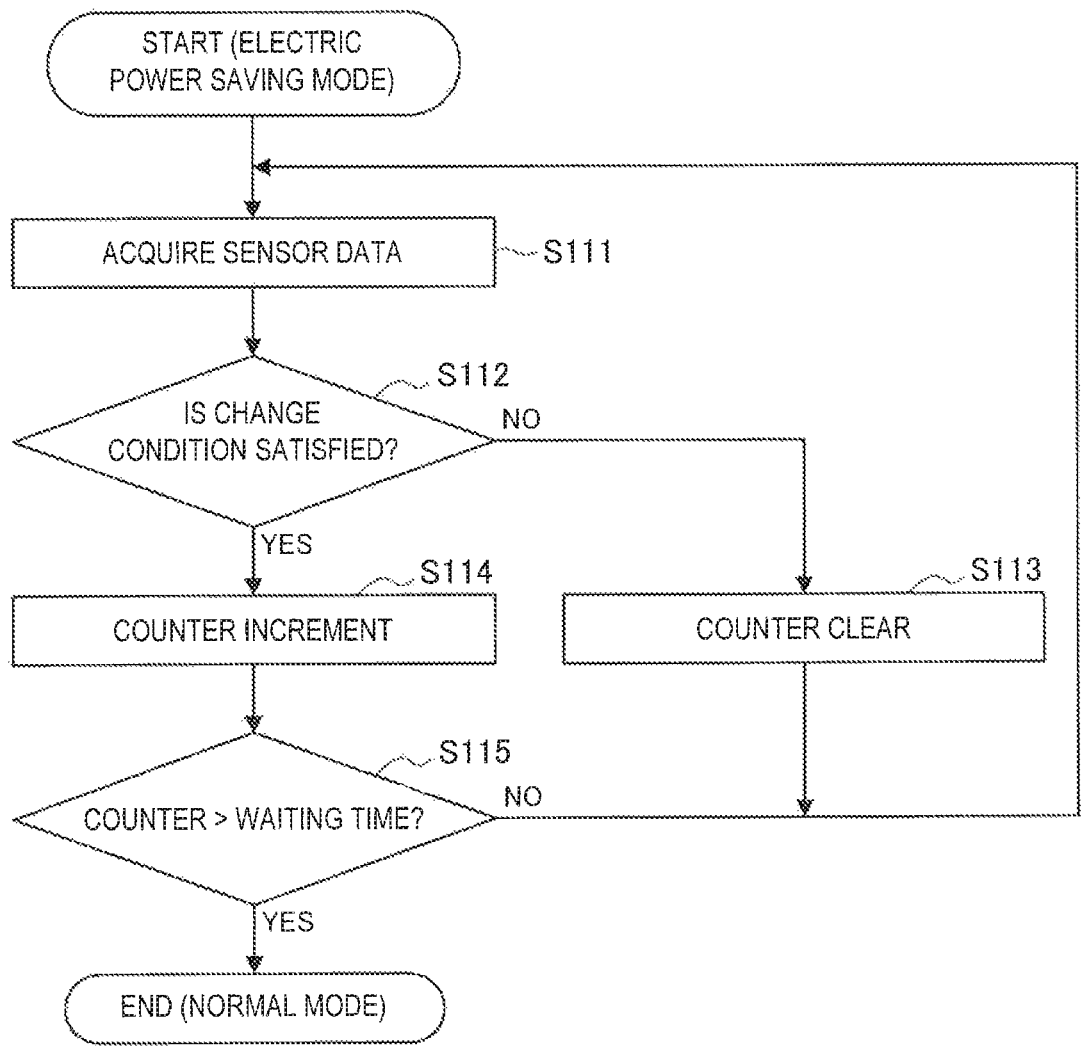
FIG. 7 is a flow diagram illustrating an exemplary operation of a sensor device 100 according to an embodiment of the present disclosure.

FIG. 7 is a flow diagram illustrating an exemplary operation of the sensor device 100 according to an embodiment of the present disclosure. FIG. 7 illustrates is an exemplary operation of the sensor device 100 when the operation mode changes to the normal mode, under a circumstance that the operation mode of the sensor device 100 according to an embodiment of the present disclosure is the electric power saving mode. In the following, an exemplary operation of the sensor device 100 according to an embodiment of the present disclosure will be described by using FIG. 7.

The sensor unit 140 acquires the state of the sensor device 100 at a predetermined sampling rate. Note that, as described above, in the ease of the electric power saving mode, only the sensors of a part of the sensor unit 140 acquire data at a lower sampling rate than in the normal mode, for example. The data that the sensor unit 140 has acquired at the lower predetermined sampling rate than in the normal mode is sequentially acquired by the control unit 110 (step S111).

When the control unit 110 sequentially acquires the data acquired by the sensor unit 140, the control unit 110 periodically determines whether or not the data acquired by the sensor unit 140 satisfies a change condition to a predetermined normal mode, by using the data acquired by the sensor unit 140 (step S112). The change condition to the normal mode may be, for example, satisfying at least one of conditions such as sensing a large acceleration by the sensor unit 140, sensing a shock, and a change of the orientation of the hitting tool, If the data acquired by the sensor unit 140 does not satisfy the predetermined change condition to the normal mode (step S112, No), the control unit 110 clears the counter (step S113), and returns to the process of step S111. On the other hand, if the data acquired by the sensor unit 140 satisfies the predetermined change condition to the normal mode (step S112, Yes), the control unit 110 increments the counter (step S114).

Upon incrementing the counter in above step S114, the control unit 110 subsequently determines whether or not the value of the counter has exceeded a predetermined value, in other words, satisfies the predetermined change condition to the normal mode for over a predetermined waiting time (step S115).

As a result of the determination of above step S115, if it is determined that the value of the counter does not exceed the predetermined value, in other words, the predetermined change condition to the normal mode does not continue for over the predetermined waiting time (step S115, No), the control unit 110 returns to the process of step S111. On the other hand, as a result of the determination of above step S115, if it is determined that the value of the counter exceeds the predetermined value, in other words, the predetermined change condition to the normal mode continues for over the predetermined waiting time (step S115, Yes), the control unit 110 changes the operation mode of the sensor device 100 to the normal mode.

When changing the operation mode of the sensor device 100 to the normal mode, the control unit 110 operates only all sensors of the sensor unit 140, and increases the sampling rate of the sensors, and switches the switch unit 160 in such a manner to apply electric current to the memory 130 and the communication unit 150 as well, for example. Also, when changing the operation mode of the sensor device 100 to the normal mode, the control unit 110 changes to operate with an increased clock of the control unit 110 itself, if having changed to operate with a reduced clock of the control unit 110 itself.

The sensor device 100 according to an embodiment of the present disclosure can change from the low electric power consumption state to the normal electric power consumption state automatically, on the basis of a feature of a situation in which the hitting tool to which the sensor device 100 is attached is used, by executing the operation as illustrated in FIG. 7.

The waiting time of step S105 in the flow diagram illustrated in FIG. 6 and the waiting time of step S115 in the flow diagram illustrated in FIG. 7 may be same and may be different. The sensor device 100 according to an embodiment of the present disclosure can prevent frequent switching of the operation mode, by setting a waiting time of a certain length (for example, 1 to 2 seconds).

Although, in the example that has been described above, the electric power consumption is reduced by reducing types of the sensors operated in the sensor unit 140, and then reducing the sampling rate, and reducing the clock of the control unit 110, when the operation mode of the sensor device 100 changes to the electric power saving mode, the present disclosure is not limited to such an example.

For example, when the sensor unit 140 includes a memory, the sensor unit 140 may be provided with a counter additionally, in order to cause the sensor unit 140 to perform the count operation illustrated in FIGS. 6 and 7, and in order to cause the sensor unit 140 to determine whether or not to have satisfied the change condition of the operation mode of the sensor device 100. When causing the sensor unit 140 to perform the count operation and causing the sensor unit 140 to determine whether or not to have satisfied the change condition of the operation mode of the sensor device 100, the control unit 110 stops its operation while the state of the sensor device 100 is the electric power saving mode.

Figure 8:
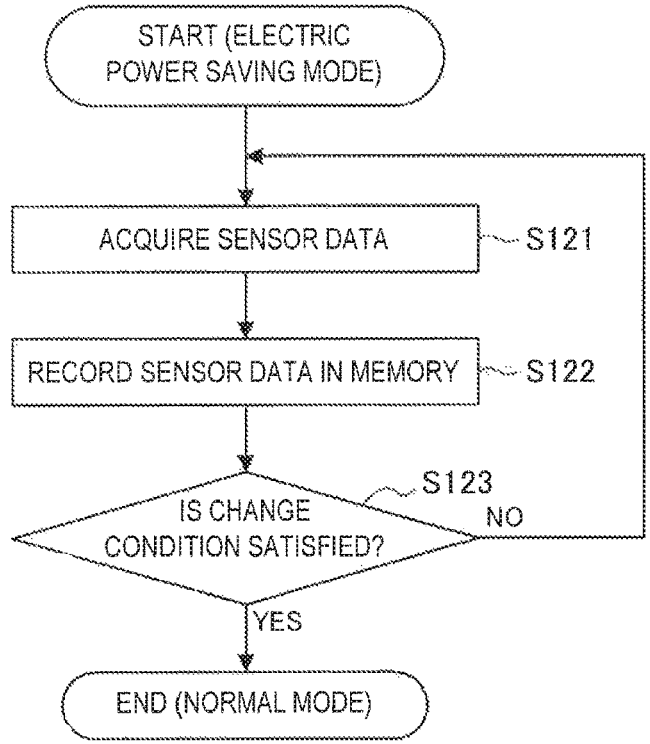
FIG. 8 is a flow diagram illustrating an exemplary operation of a sensor device 100 according to an embodiment of the present disclosure.

FIG. 8 is a flow diagram illustrating an exemplary operation of the sensor device 100 according to an embodiment of the present disclosure. FIG. 8 illustrates an exemplary operation of the sensor device 100, when the operation mode changes to the normal mode, under a circumstance that the operation mode of the sensor device 100 according to an embodiment of the present disclosure is the electric power saving mode. Also, FIG. 8 illustrates an exemplary operation of the sensor device 100, when causing the sensor unit 140 to determine whether or not to have satisfied the change condition of the operation mode of the sensor device 100. In the following, an exemplary operation of the sensor device 100 according to an embodiment of the present disclosure will be described by using FIG. 8.

In the same way as step S111 of FIG. 7, in the case of the electric power saving mode, only a part of sensors of the sensor unit 140 acquires data at a lower sampling rate than in the normal mode, for example. The data acquired by the sensor unit 140 at the lower predetermined sampling rate than in the normal mode is acquired sequentially by the sensor unit 140 (step S121).

The sensor unit 140 records the acquired data in the memory inside the sensor unit 140 (step S122). It is supposed that, even if the sensor unit 140 has an internal memory, the sensor unit 140 can only have a memory of a small storage capacity as compared to the memory 130. Thus, the sensor unit 140 contains the acquired data in what is called FIFO (First In, First Out) scheme, when recording the acquired data in the memory inside the sensor unit 140.

The acquired data is recorded in the memory inside the sensor unit 140, so that the control unit 110 acquires the data accumulated in the memory of the sensor unit 140, when the operation mode of the sensor device 100 changes to the normal mode. The control unit 110 acquires the data acquired by the sensor unit 140 around the time point at which the operation mode of the sensor device 100 changes from the electric power saving mode to the normal mode, so that the state of the hitting tool around the time point at which the operation mode of the sensor device 100 changes from the electric power saving mode to the normal mode can be transmitted to the analysis device 200.

Upon acquiring the data acquired by the sensor unit 140 sequentially and recording the data in the internal memory, the sensor unit 140 periodically determines whether or not the data acquired by the sensor unit 140 satisfies a predetermined change condition to the normal mode, by using the recorded data (step S123). The change condition to the normal mode may be, for example, satisfying at least one of conditions, such as sensing a large acceleration by the sensor unit 140, sensing a shock, and a change of the orientation of the hitting tool.

If the data acquired by the sensor unit 140 does not satisfy the predetermined change condition to the normal mode (step S123, No), the sensor unit 140 returns to the process of step S121. On the other hand, if the data acquired by the sensor unit 140 satisfies the predetermined change condition to the normal mode (step S123, Yes), the sensor unit 140 sends an instruction for causing the control unit 110 to change the sensor device 10 to the normal mode. The control unit 110 executes a process for changing the sensor device 100 to the normal mode, upon acquiring the instruction for changing to the normal mode from the sensor unit 140.

Although not illustrated in the exemplary operation of FIG. 8, the sensor unit 140 may have a counter inside, and the sensor unit 140 may execute the same count operation as the operation illustrated in FIG. 7.

Another exemplary operation of the sensor device 100 when the operation mode changes to the normal mode under a circumstance that the operation mode of the sensor device 100 according to an embodiment of the present disclosure is the electric power saving mode will be described. A sensor for acquiring data of the condition for changing from the electric power saving mode to the normal mode may be provided in the sensor unit 140 of the sensor device 100. Such a sensor is, for example, a pressure sensor, a temperature sensor, an air pressure sensor, or the like. When the sensor device 100 is provided at a position close to the grip part of the hitting tool, the sensor device 100 is configured in such a manner that the pressure sensor, the temperature sensor, the air pressure sensor, or the like can detect a state change of pressure, temperature, air pressure, or the like generated by the user holding the grip, so that the sensor device 100 can use generation of the state change as a condition for changing from the electric power saving mode to the normal mode.

Figure 9:
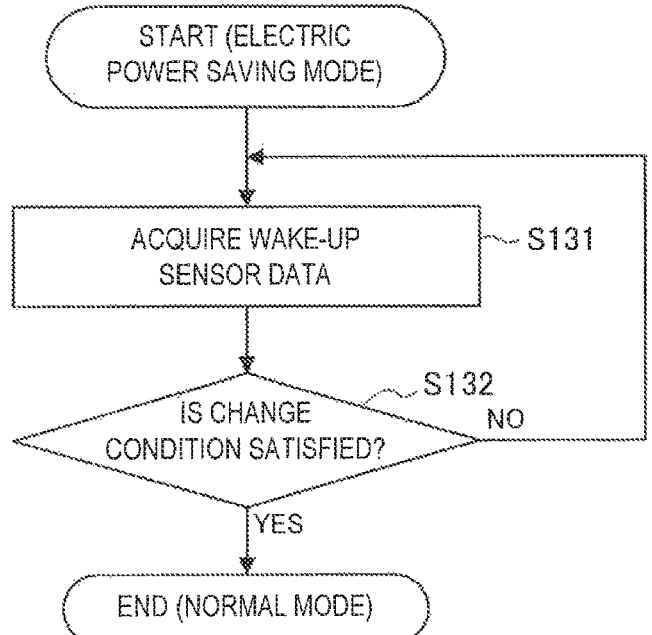
FIG. 9 is a flow diagram illustrating an exemplary operation of a sensor device 100 according to an embodiment of the present disclosure.

FIG. 9 is a flow diagram illustrating an exemplary operation of the sensor device 100 according to an embodiment of the present disclosure. FIG. 9 illustrates an exemplary operation of the sensor device 100, when the operation mode changes to the normal mode, under a circumstance that the operation mode of the sensor device 100 according to an embodiment of the present disclosure is the electric power saving mode. In the following, an exemplary operation of the sensor device 100 according to an embodiment of the present disclosure will be described by using FIG. 9.

FIG. 9 illustrates an exemplary operation when provided with sensors that detect a state change generated by the user holding the grip, such as a pressure sensor, a temperature sensor, and an air pressure sensor, as the sensors of the sensor unit 140. The sensor that detects the state change generated by the user holding the grip is also referred to as a wake-up sensor in the following.

The control unit 110 or the sensor unit 140 sequentially acquires the data detected by the wake-up sensor (step S131). Subsequently, the control unit 110 or the sensor unit 140 periodically determines whether or not the data acquired by the wake-up sensor in the sensor unit 140 satisfies a predetermined change condition to the normal mode (step S132), If the data acquired by the wake-up sensor in the sensor unit 140 does not satisfy the predetermined change condition to the normal mode (step S132, No), the control unit 110 or the sensor unit 140 returns to the process of step S131. On the other hand, if the data acquired by the wake-up sensor in the sensor unit 140 satisfies the predetermined change condition to the normal mode (step S132, Yes), the control unit 110 or the sensor unit 140 executes a process for changing the sensor device 100 to the normal mode.

When the control unit 110 operates with low clock in the electric power saving mode, the clock is increased, and the switch unit 160 is controlled to restart applying electric current to the memory 130, the sensor unit 140, and the communication unit 150, as a process for changing the sensor device 100 to the normal mode, for example. Also, as illustrated in the exemplary operation of FIG. 8, when the control unit 110 stops its operation in the electric power saving mode, the sensor unit 140 sends an instruction for causing the control unit 110 to change the sensor device 10 to the normal mode, as the process for changing the sensor device 100 to the normal mode.

As described above, the sensor device 100 according to an embodiment of the present disclosure is provided with the wake-up sensor independently, in order to change from the low electric power consumption state to the normal electric power consumption state automatically, on the basis of a feature of a situation in which the hitting tool to which the sensor device 100 is attached is used.

Lastly, an example of electric power consumption of the sensor device 100 according to an embodiment of the present disclosure having the above configuration and executing the above operation is illustrated.

Figure 10:
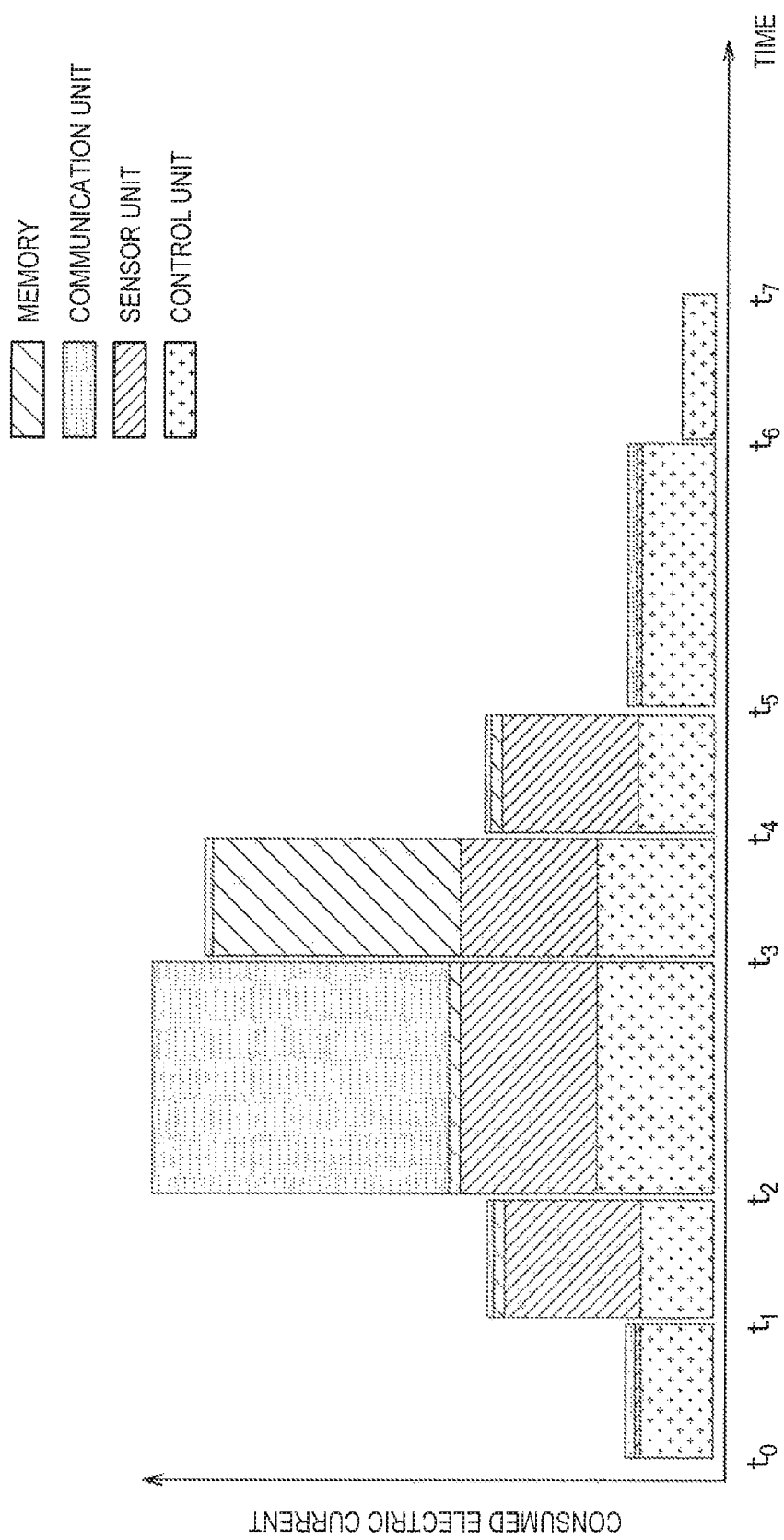
FIG. 10 is an explanatory diagram illustrating an example of a change of electric power consumption of a sensor device 100 according to an embodiment of the present disclosure, with a graph.

FIG. 10 is an explanatory diagram illustrating an example of a change of electric power consumption of the sensor device 100 according to an embodiment of the present disclosure, with a graph. In the graph illustrated in FIG. 10 the horizontal axis represents time, and the vertical axis represents consumed electric current. Also, the graph illustrated in FIG. 10 is an example when the sensor unit 140 is provided with two types of sensors including a shock sensor and a motion sensor.

During a period from a time point t0 to t1, the sensor device 100 operates in the electric power saving mode. During this period, the control unit 110 operates with low electric power consumption, and the motion sensor of the sensor unit 140 operates at a low sampling rate, and the shock sensor stops its operation. Further, during the period from the time point t0 to t1, the communication unit 150 also stops its operation, or operates with extremely small electric current consumption.

At the time point t1, when the user starts take-back movement, holding the racket for example, the control unit 110 determines that the change condition to the normal mode is satisfied, and sends the command for increasing the sampling rate, to the shock sensor and the motion sensor of the sensor unit 140. The shock sensor and the motion sensor that have received the command performs sensing operation with an increased sampling rate. The period from the time point t1 to t2 can also be said to be a period for waiting for a ball to hit the racket, for example.

At the time point t2, if the ball hits the racket for example, the shock sensor detects vibration generated by the ball hitting the racket. The data of the vibration detected by the shock sensor is acquired by the control unit 110, and is transmitted by the communication unit 150. FIG. 10 illustrates a situation in which the transmission time by the communication unit 150 continues until the time point t3.

When the transmission of the data of the vibration detected by the shock sensor from the communication unit 150 ends at the time point t3, the control unit 110 subsequently writes the data of the vibration detected by the shock sensor into the memory 130. FIG. 10 illustrates a situation in which the write time into the memory 130 continues until the time point t4.

During a period from the time point t2 to t4 illustrated in FIG. 10, the consumed electric current of the control unit 110 also increases. This means that the consumed electric current of the control unit 110 increases, for the purpose of transmission of the data of the vibration detected by the shock sensor, to the communication unit 150 and the memory 130.

When the write of the data of the vibration detected by the shock sensor into the memory 130 ends at the time point t4, the sensor device 100 waits for the ball to hit the racket, in the same way as the period from the time point t1 to t2, for example.

Thereafter, when the control nit 110 determines that the change condition to the electric power saving mode is satisfied at the time point t5, the sensor device 100 is such that the control unit 110 operates with low electric power consumption, and the motion sensor of the sensor unit 140 also operates at a low sampling rate, and the shock sensor stops its operation, in the same way as the period from the time point t0 to t1.

Then, when the user turns off the power supply of the sensor device 100 at the time point t6 for example, the sensor device 100 executes a predetermined operation for power supply of until the time point t7, and the consumed electric current disappears completely at the time point t7.

The sensor device 100 according to an embodiment of the present disclosure has the above configuration, and can achieve efficient electrical power saving by executing the above operation. The sensor device 100 according to an embodiment of the present disclosure can remove an obstructive factor of play of sport (for example, tennis) of the user, such as frequent charge, battery exchange, and weight increase of the sensor device 100, by the achievement of the efficient electrical power saving. Then, the sensor device 100 according to an embodiment of the present disclosure allows the user to enjoy the play, while acquiring data associated with the play of the user.

2. CONCLUSION

As described above, according to an embodiment of the present disclosure, there is provided a sensor device 100 including a sensor that detects a state, for example motion and orientation and shock given to a tool, of the tool used by the user, such as a tennis racket, the sensor device 100 being configured to automatically change from the normal mode to the electric power saving mode and from the electric power saving mode to the normal mode in response to the state of the tool.

The sensor device 100 according to an embodiment of the present disclosure automatically changes the operation mode of the sensor device 100 from the normal mode to the electric power saving mode, when the control unit 110 determines that the tool used by the user keeps a specific orientation for a predetermined time on the basis of the sensing data acquired by the sensor unit 140, while the operation mode is the normal mode, for example.

Also, the sensor device 100 according to an embodiment of the present disclosure automatically changes the operation mode of the sensor device 100 from the electric power saving mode to the normal mode, when the control unit 110 determines that the tool used by the user has moved with large acceleration, or has received a shock, or changes its orientation, on the basis of the sensing data acquired by the sensor unit 140, while the operation mode is the electric power saving mode, for example.

The sensor device 100 according to an embodiment of the present disclosure automatically changes to the low electric power consumption state, and changes to the normal electric power consumption state, on the basis of a feature of a situation in which the tool to which the sensor device 100 is attached is used.

Although, in the above embodiment, the information processing system including the sensor device and the analysis device (each can be an information processing device) has been described, the embodiment of the present disclosure also includes a server on a network that configures at least a part of the function of the analysis device (including what is configured with a group of functions of a plurality of devices), a program for implementing the functions of these devices in a computer, and a non-transitory tangible recording medium recording such a program, for example.

Also, although, in the above embodiment, an example in which the sensor device and the analysis device are separated has been described, the sensor device and the analysis device may be integrated into one body in another embodiment of the present disclosure. In this case, the sensor device acquires time-series data from the sensor, and sets a motion interval in the time-series data, and determines a motion pattern by analyzing the motion interval, and outputs a determination result by itself, or transmits the determination result to a server or a terminal device on a network.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification, Additionally, the present technology may also be configured as below, (1)
A sensor device including:
a sensor unit configured to directly or indirectly detect sensing data indicating a motion and an orientation of a hitting tool;
a communication unit configured to transmit the sensing data detected by the sensor unit to an external device; and
a control unit configured to control operation of the sensor unit and the communication unit,
wherein the control unit or the sensor unit changes at least one of the sensor unit and the control unit to an electric power saving mode, upon detecting that the hitting tool has a specific orientation for a certain amount of time.

(2)
The sensor device according to (1), wherein
the control unit or the sensor unit changes at least one of the sensor unit and the control unit from a normal mode to the electric power saving mode, upon detecting that the hitting tool has an orientation facing toward a substantially gravity force direction for a certain amount of time.

(3)
The sensor device according to (2), wherein
the control unit or the sensor unit changes at least one of the sensor unit and the control unit to the electric power saving mode, upon detecting that the sensing data experiences a change equal to or smaller than a specific value during a specific time.

(4)
The sensor device according to any of (1) to (3), wherein
the control unit or the sensor unit changes at least one of the sensor unit and the control unit from the electric power saving mode to a normal mode, upon detecting that the hitting tool does not have an orientation facing toward a gravity force direction for a certain amount of time.

(5)
The sensor device according to any of (1) to (4), wherein
the control unit or the sensor unit changes at least one of the sensor unit and the control unit from the electric power saving mode to a normal mode, upon detecting that the sensing data experiences a change equal to or greater than a specific value during a specific time.

(6)
The sensor device according to any of (1) to (5), further including:
a main memory; and
a temporary storage memory configured to temporarily store the sensing data detected by the sensor unit,
wherein, when the control unit or the sensor unit detects that the sensing data experiences a changes equal to or greater than a specific value during a specific time, the control unit changes from the electric power saving mode to a normal mode, and the control unit records in the main memory or transmits via the communication unit, the sensing data that is already stored in the temporary storage memory.

(7)
The sensor device according to any of (1) to (6), wherein
the sensor unit includes a sensor for detecting a hold of the hitting tool, and
the control unit changes at least one of the sensor unit and the control unit from the electric power saving mode to a normal mode, in response to a detection result of the sensor.

(8)
A recording medium having a computer program recorded thereon, the computer program causing a computer to execute:
a control step for controlling a sensor unit that directly or indirectly detects sensing data indicating a motion and an orientation of a hitting tool, a communication unit that transmits the sensing data detected by the sensor unit to an external device, and a control unit that controls operation of the sensor unit and the communication unit,
wherein the control step includes changing at least one of the sensor unit and the control unit to an electric power saving mode, when the control unit or the sensor unit detects that the hitting tool has a specific orientation for a certain amount of time.

REFERENCE SIGNS LIST

100 sensor device
110 control unit
120 battery
130 memory
140 sensor unit
150 communication unit
160 switch unit
161, 162, 163 switch

The invention claimed is:
1. A sensor device comprising:
a sensor unit configured to directly or indirectly acquire sensing data indicating a motion and an orientation of a hitting tool;
a communication unit configured to transmit the sensing data acquired by the sensor unit to an external device;

a control unit configured to control operation of the sensor unit and the communication unit, wherein the control unit or the sensor unit
detects that the hitting tool has a specific orientation for a certain amount of time, and
changes from a normal mode to an electric power saving mode, based on detecting that the hitting tool has the specific orientation for the certain amount of time, wherein the control unit or the sensor unit changes from the electric power saving mode to the normal mode based on detecting that the orientation of the hitting tool changes;

a main memory; and a temporary storage memory configured to temporarily store the sensing data acquired by the sensor unit in the electric power saving mode, wherein the control unit acquires the data accumulated in the temporary storage memory of the sensor unit when the control unit or the sensor unit changes from the electric power saving mode to the normal mode, wherein the specific orientation includes the hitting tool having an orientation such that a direction, from one end of the hitting tool towards another end of the hitting tool, is toward a substantially gravity force direction, and wherein the sensor unit, the communication unit, and the control unit are each implemented via at least one processor.

2. The sensor device according to claim 1, wherein
the control unit or the sensor unit changes from the normal mode to the electric power saving mode, based on detecting that the sensing data satisfies a change condition,
the change condition includes a plurality of conditions, and
the control unit or the sensor unit changes from the normal mode to the electric power saving mode, based on detecting a condition, of the plurality of conditions, that the hitting tool has the orientation facing toward the substantially gravity force direction for the certain amount of time.

3. The sensor device according to claim 2, wherein
the control unit or the sensor unit changes to the electric power saving mode, based on detecting another condition, of the plurality of conditions, that the sensing data experiences a change equal to or smaller than a specific value during a specific time.

4. The sensor device according to claim 1, wherein
the control unit or the sensor unit changes from the electric power saving mode to the normal mode, based on detecting that the hitting tool does not have the orientation facing toward the substantially gravity force direction for the certain amount of time.

5. The sensor device according to claim 1, wherein
the control unit or the sensor unit changes from the electric power saving mode to the normal mode, based on detecting that the sensing data experiences a change equal to or greater than a specific value during a specific time.

6. The sensor device according to claim 1,
wherein, when the control unit or the sensor unit detects that the sensing data experiences changes equal to or greater than a specific value during a specific time, the control unit changes from the electric power saving mode to the normal mode, and the control unit records in the main memory or transmits via the communication unit, the sensing data that is already stored in the temporary storage memory.

7. The sensor device according to claim 1, wherein
the sensor unit includes a sensor for detecting a hold of the hitting tool, and
the control unit or the sensor unit changes from the electric power saving mode to the normal mode, in response to a detection result of the sensor.

8. A non-transitory computer-readable recording medium having a computer program recorded thereon, which when executed by a computer causes the computer to execute a method, the method comprising:
controlling a sensor unit to directly or indirectly acquire sensing data indicating a motion and an orientation of a hitting tool at a predetermined sampling rate in a normal mode;
detecting that the hitting tool has a specific orientation for a certain amount of time;
changing from the normal mode to an electric power saving mode, based on detecting that the hitting tool has the specific orientation for the certain amount of time;
changing from the electric power saving mode to the normal mode, based on detecting that the orientation of the hitting tool changes;
temporarily storing the sensing data acquired by the sensor unit in a temporary storage medium in the electric power saving mode;
acquiring the data accumulated in the temporary storage memory of the sensor unit when changing from the electric power saving mode to the normal mode; and
transmitting the sensing data acquired by the sensor unit to an external device,
wherein the specific orientation includes the hitting tool having an orientation such that a direction, from one end of the hitting tool towards another end of the hitting tool, is toward a substantially gravity force direction.

9. The sensor device according to claim 1, wherein the control unit operates with a clock frequency to control the sensor unit in the normal mode, and the control unit operates with a reduced clock frequency lower than the clock frequency to control the sensor unit in the electric power saving mode.

10. The non-transitory computer-readable recording medium according to claim 8, wherein the executed method further comprises:
operating in accordance with a clock frequency to control the sensor unit in the normal mode and operating in accordance with a reduced clock frequency lower than the clock frequency to control the sensor unit in the electric power saving mode.

11. The sensor device according to claim 1, wherein the sensor unit acquires the sensing data at a predetermined sampling rate in the normal mode, and the sensor unit acquires the sensing data at a reduced sampling rate lower than the predetermined sampling rate in the electric power saving mode.

12. A method comprising:
controlling a sensor unit to directly or indirectly acquire sensing data indicating a motion and an orientation of a hitting tool at a predetermined sampling rate in a normal mode;
detecting that the hitting tool has a specific orientation for a certain amount of time;

changing from the normal mode to an electric power saving mode, based on detecting that the hitting tool has the specific orientation for the certain amount of time;

changing from the electric power saving mode to the normal mode, based on detecting that the orientation of the hitting tool changes;

temporarily storing the sensing data acquired by the sensor unit in a temporary storage medium in the electric power saving mode;

acquiring the data accumulated in the temporary storage memory of the sensor unit when changing from the electric power saving mode to the normal mode; and transmitting the sensing data acquired by the sensor unit to an external device, wherein the specific orientation includes the hitting tool having an orientation such that a direction, from one end of the hitting tool towards another end of the hitting tool, is toward a substantially gravity force direction.

13. The method according to claim 12, further comprising:

changing from the normal mode to the electric power saving mode, based on detecting that the sensing data satisfies a change condition, wherein the change condition includes a plurality of conditions; and changing from the normal mode to the electric power saving mode, based on detecting a condition, of the plurality of conditions, that the hitting tool has the orientation facing toward the substantially gravity force direction for the certain amount of time.

14. The method according to claim 12, further comprising:

changing from the electric power saving mode to the normal mode, based on detecting that the hitting tool does not have the orientation facing toward the substantially gravity force direction for the certain amount of time.

15. The method according to claim 12, further comprising:

changing from the electric power saving mode to the normal mode, based on detecting that the sensing data experiences a change equal to or greater than a specific value during a specific time.

16. The sensor device according to claim 1, wherein the one end includes a holding section of the hitting tool and the another end includes a hitting section of the hitting tool.

* * * * *